(12) United States Patent
Grove et al.

(10) Patent No.: US 7,617,160 B1
(45) Date of Patent: Nov. 10, 2009

(54) CHOICE-BASED RELATIONSHIP SYSTEM (CRS)

(75) Inventors: Michael Grove, Redwood City, CA (US); Deborah Grove, Redwood City, CA (US); Larry Van der Veen, San Carlos, CA (US); Alexei Strots, San Jose, CA (US)

(73) Assignee: Michael I. Grove, Redwood City, CA (US)

( * ) Notice: Subject to any disclaimer, the term of this patent is extended or adjusted under 35 U.S.C. 154(b) by 833 days.

(21) Appl. No.: 10/361,099

(22) Filed: Feb. 5, 2003

(51) Int. Cl.
*G06Q 90/00* (2006.01)
(52) U.S. Cl. .................................................. 705/500
(58) Field of Classification Search .................. 705/1, 705/500; 707/1–6; 713/182–185
See application file for complete search history.

(56) References Cited

U.S. PATENT DOCUMENTS

| | | | | |
|---|---|---|---|---|
| 6,058,367 | A * | 5/2000 | Sutcliffe et al. | 705/1 |
| 6,085,166 | A * | 7/2000 | Beckhardt et al. | 705/9 |
| 6,101,480 | A * | 8/2000 | Conmy et al. | 705/9 |
| 6,144,964 | A * | 11/2000 | Breese et al. | 707/10 |
| 6,175,831 | B1 | 1/2001 | Weinreich et al. | |
| 6,249,282 | B1 * | 6/2001 | Sutcliffe et al. | 715/751 |
| 6,735,568 | B1 * | 5/2004 | Buckwalter et al. | 705/1 |
| 2001/0014866 | A1 * | 8/2001 | Conmy et al. | 705/9 |
| 2002/0038233 | A1 * | 3/2002 | Shubov et al. | 705/8 |
| 2002/0052873 | A1 * | 5/2002 | Delgado et al. | 707/7 |
| 2002/0131565 | A1 * | 9/2002 | Scheuring et al. | 379/88.19 |
| 2002/0194049 | A1 * | 12/2002 | Boyd | 705/9 |
| 2003/0005055 | A1 * | 1/2003 | Ralston et al. | 709/204 |
| 2003/0149606 | A1 * | 8/2003 | Cragun et al. | 705/8 |
| 2003/0154116 | A1 * | 8/2003 | Lofton | 705/8 |
| 2003/0204474 | A1 * | 10/2003 | Capek et al. | 705/64 |
| 2003/0217105 | A1 * | 11/2003 | Zircher et al. | 709/205 |
| 2004/0064585 | A1 * | 4/2004 | Doss et al. | 709/246 |
| 2004/0093290 | A1 * | 5/2004 | Doss et al. | 705/35 |

OTHER PUBLICATIONS

"Classmates gets even more interesting." Press Release: Classmates. com; May 15, 2001.*
Meetup.com Homepage. Aug 2, 2002. Available at Archive.org.*
Bearman, David; Trant, Jennifer, "Electronic Records Research Working Meeting, May 28-30, 1997: A Report from the Archinves Community", American Society for Information Science. Bulletin, v24n3, pp. 13-17, Feb./Mar. 1998.*
ezboard HyperMatch, Welcome to HyperMatch the web's coolest online people matcher, ezboard, Inc., 1 page, Jan. 29, 2003, http://www.hypermatch.com/.

* cited by examiner

*Primary Examiner*—Mary Cheung

(57) ABSTRACT

A method and apparatus for building relationship opportunities for event participants with similar interests before, during and after the event are disclosed. The method includes creating a profile of a first user registered for an event, the profile includes terms indicative of preferences and characteristics of the first user. The method also includes receiving an inquiry from the first user for at least one match based on at least one keyword and providing a list of matches to the user in response to the inquiry, wherein the match is a second user sharing similar interests with the first user.

21 Claims, 14 Drawing Sheets

| Home | Profile | Match | Get Mail | Sent Mail | Help | About | Logout |

My Professional Profile a. You may only select one choice to indicate "Who I Am".
b. You may have multiple responses for "Who I'd like to meet".

| Who I am | I'd like to meet | *1. I am coming to Demo 2003 as one of the following: |
|---|---|---|
| ○ | ☐ | Executive of a technology company |
| ○ | ☐ | Executive of a non-technology company |
| ○ | ☐ | Venture investor |
| ○ | ☐ | Member of the media |
| ○ | ☐ | Public relations professional |
| ⊙ | ☐ | Consultants and/or analysts |
| ○ | ☑ | Demonstrator launching an enterprise technology product |
| ○ | ☑ | Demonstrator launching a consumer technology product |
| ○ | ☑ | Demonstrator launching a core technology component |
| ○ | ☐ | Entrepreneur seeking new financing in an early stage investment |
| ○ | ☐ | Entrepreneur seeking new financing in a growth stage investment |
| ○ | ☐ | Entrepreneur seeking new financing in a mezzanine stage investment |
| ○ | ☐ | Member of the Network World/IDG EF Staff |
| ○ | ☐ | Other |

| | 2. My professional objectives at the conference are to: |
|---|---|
| ☐ | Find technology partners |
| ☐ | Find investments |
| ☑ | Find customers |
| ☐ | Meet the press |
| ☐ | Meet analysts/consultants |
| ☑ | Introduce our company to investors |
| ☐ | Meet potential outside Directors or Advisors for my Board |
| ☑ | See new products |
| ☐ | Other |

| | 3. With industry peers, I'd like to discuss: |
|---|---|
| ☑ | Enterprise software directions |
| ☑ | Small business software directions |
| ☑ | Telecommunications standards |

FIG 5

| Home | Profile | Match | Get Mail | Sent Mail | Help | About | Logout |

Match to connect with the people you really want to meet

According to my profile information I wish to connect with others who:

- ⊙ offer what I need or need what I offer
- ○ share my professional interests
- ○ share my personal interests
- ○ match on all criteria
  - OR -
- ○ perform an advanced search

Which choice should I make?
Successful matches depend on the size of the participant group, your profile preferences, and the choice you make on this page. You can connect with others who share similar interests or can help you reach you goals.

If you want to match with others that:

- Will help you get things done, or provide advice: select "offer what I need or need what I offer".
- need your assistance: select "offer what I need or need what I offer".
- share you rinterests: select either "share my professional interests" or "share my personal interests".
- are more like you: select "match on all criteria".

When to use Advanced Search?
If you wish to focus your search, select "perform an advanced search". The advanced search allows you to select up to 25 items from your original preferences. If you are not receiving the desired result, you may alter your profile preferences.

| Home | Profile | Match | Get Mail | Sent Mail | Help | About | Logout |

FIG. 7

| Home | Profile | Match | Get Mail | Sent Mail | Help | About | Logout |

Complementary matches with other participants.

Below are aliases for those participants who your stated criteria.

Check Yes to add participants to your list.

You may connect with up to 10 participants at this time.

Click Next to view the next 10 listings, if applicable.

Click Compose Messages to advance to the Introplus 1:1 email system.

| Match words | Alias | Yes |
|---|---|---|
| Consultants and/or analysts, Customers (enterprise), Demonstrator launching an enterprise technology product... | patrink44 | ☐ |
| Demonstrator launching an enterprise technology product, Distribution channels, Doing diligence on potential investments... | mcgriddick | ☐ |
| Demonstrator launching a consumer technology product, Distribution channels, eCommerce/eBusiness seed/early stage... | sebastian | ☐ |
| Doing diligence on potential investments, Enterprise IT infrastructure/middleware seed/early stage, Manufacturing automation seed/early stage... | typical111 | ☐ |
| Customers (enterprise), Demonstrator launching an enterprise technology product, Marketing... | lulu | ☐ |
| Customers (enterprise), Distribution channels, Marketing... | uyuyuy | ☐ |
| Customers (enterprise), Distribution channels, Enterprise IT infrastructure/middleware seed/early stage... | bloomingdale | ☐ |
| Consultants and/or analysts, Demonstrator launching a consumer technology product, Distribution channels... | perryp | ☐ |
| Consultants and/or analysts, Customers (enterprise) | Bills | ☐ |
| Distribution channels, Marketing | liebduss | ☐ |

FIG. 8

| Home | Profile | Match | Get Mail | Sent Mail | Help | About | Logout |

You may select predefined messages or you may create your own messages to send to Demo 2003 participants interests correlate with your own. If you want to use our predefined messages, select one and check those atte that you would like to contact with that message. The "matches" will automatically change with each individual email alias.

Press submit after you have made your selections.

Select message
- ○ Let's make plans now
- ○ Meet at destination
- ○ Apologies and regrets
- ○ Compose my own letter Check to review and send:
☐ patrink44    Consultants and/or analysts, Customers (enterprise), Demonstrator launching an enterprise technology product...

Subject: [Compose your own subject or select a message from above]    Send Mail

Message: [Compose your own message or choose one from the predefined messages above.]

Preview ○
Edit ●

| Home | Profile | Match | Get Mail | Sent Mail | Help | About | Logout |

CHOICE-BASED RELATIONSHIP SYSTEM (CRS)

FIELD OF THE INVENTION

The present invention pertains to the fields of knowledge management and relationship building. More particularly, the present invention relates to building relationships between event participants, between event participants and events, between event participants and communities, with shared interests before, during and after an event.

BACKGROUND OF THE INVENTION

Traveling, whether business related or pleasure, is part of today's lifestyle. Most of the traveling is associated with a particular event, such as a conference in another state, a cruise or a tour of a geographical area. Although these events attract a lot of people, there are no available means for people to get to know each other prior to, during and after the event without being physically introduced to each other. For example, if a person is interested in attending a conference, but has no means of transportation and would like to carpool to the conference, this individual has no means available to him to identify other individuals who are planning to attend the conference and who reside in the same area as the first individual. Or a person decided to attend a certain set of lectures at an event and wishes to communicate with someone who attended a different set of lectures after the event.

In addition, attendees of an event may want to know who else is attending the event and shares interests, professional or social, with them. For example, a person taking a cruise who has a passion for a game of chess may want to be able to contact another traveler who is going to take the same cruise and who also plays chess. Or, a person who likes to drink beer at dinner and play chess after dinner may want to be able to contact someone who likes to play chess and has nothing against drinking beer at dinner. As stated earlier, there are no means available currently on the market to allow people with similar interests to contact each other prior to, during or after an event in which they are participating.

Typical Internet systems that profile users attempt to offer personalized choices to achieve matches of users to their preferences, however these systems lack ability to determine which user preferences apply to particular situations. For example, while in New York a user may indicate that he likes to go to Broadway plays in the evening and would enjoy a companion, however the same user may not have any interest in seeing a play during an event In Los Angeles, but would be interested in going to the beach during the day. Typical Internet systems are not able to distinguish between user preferences for events In New York and events In Los Angeles.

What is needed, therefore, is a solution that overcomes these and other shortcomings of the prior art.

SUMMARY OF THE INVENTION

A method and apparatus for building relationship opportunities for event participants with similar interests before, during and after the event are disclosed. A profile of a first user registered for an event is created, the profile includes terms indicative of preferences and characteristics of the first user. An inquiry from the first user is received for at least one match based on at least one keyword. A list of matches is provided providing to the user in response to the inquiry, wherein the match is a second user sharing similar interests with the first user.

BRIEF DESCRIPTION OF THE DRAWINGS

The present invention is illustrated by way of example and not limitation in the figures of the accompanying drawings, in which like references indicate similar elements and in which:

FIG. 5 illustrates a graphical user interface for profile creation according to one embodiment of the invention;

FIG. 7 illustrates a graphical user interface for match searching according to one embodiment of the invention;

FIG. 8 illustrates a match list according to one embodiment of the invention;

FIG. 9 illustrates a graphical user interface for email composition according to one embodiment of the invention.

DETAILED DESCRIPTION

Figure 1:
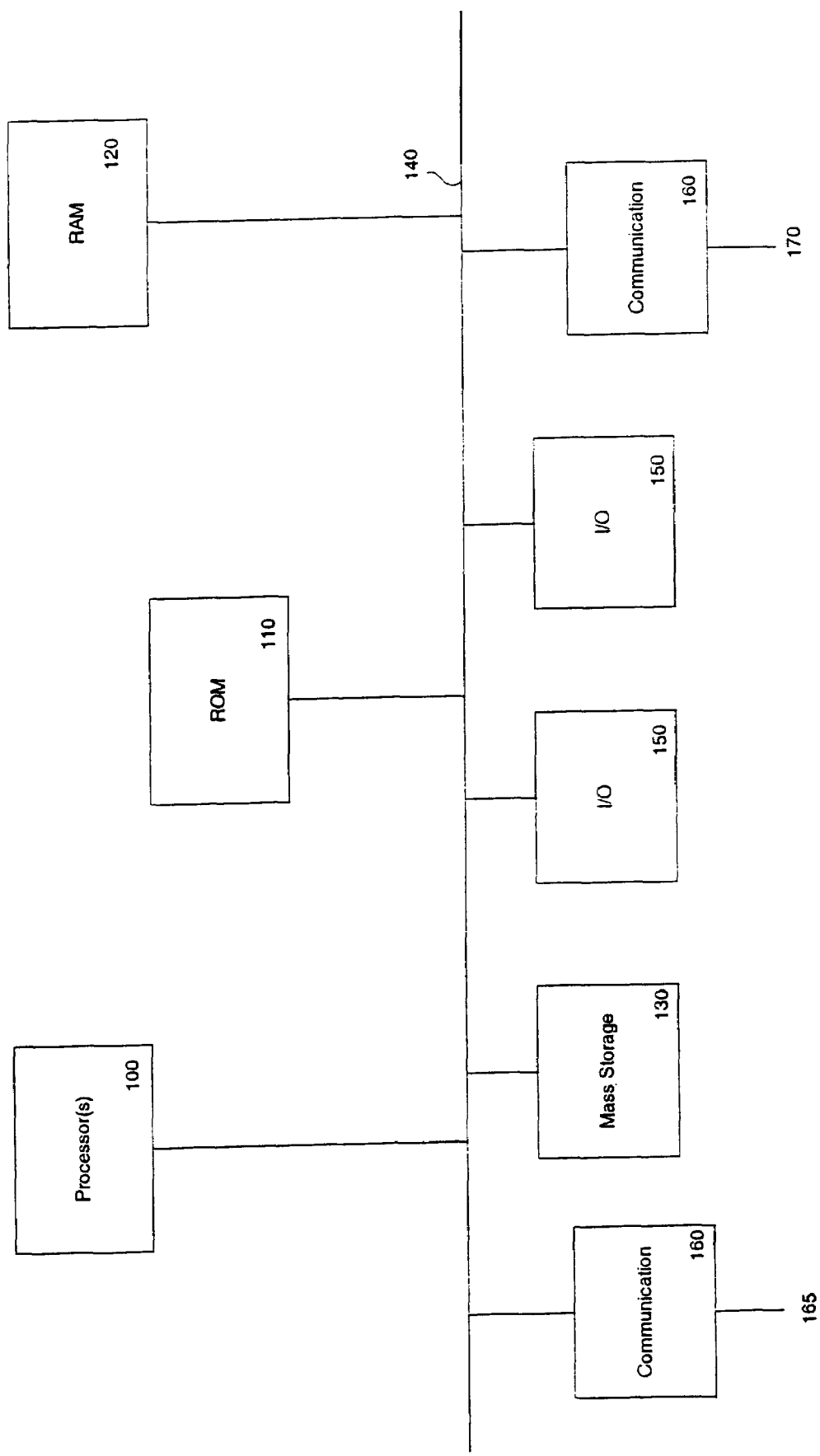
FIG. 1 illustrates an exemplary processing system according to one embodiment of the invention.

A method and apparatus for building relationship opportunities for event participants with similar interests are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

The present invention discloses a method and system for building relationship opportunities among event participants with similar interests before, during, and after the event. Participant profiles, preferences and other data are searched to identify best matches for interests indicated in a match inquiry.

It will be appreciated that the term "community", as used herein, means a group of people including at least two people that share similar interests. It will be also appreciated that the term "event", as used herein, means an event with a physical or virtual location involving a participation of a community, group of people, such as a conference, a chat session, a tour, a cruise, etc. Moreover, it will be appreciated that the term "provider", as used herein, means a provider, e.g., one or more organizers, of the event and/or community. It will also be appreciated that the term "user", as used herein, means an individual involved in a particular event and/or community. It will be appreciated that the term "meta-taxonomy", as used herein, is a structure of words maintained in hierarchical and relationship fashion. The term "meta filed", as used herein, represents classes of data and rules assigning relevance to each word in meta-taxonomy as it pertains to the user, event, provider and community. It will be appreciated that the term "profile", as used herein, means a collection of terms describing user's static information, such as age, marital status, etc., and a collection of terms describing user's dynamic information, i.e. meta-taxonomy. Thus the term "profile", as used herein, refers to the user's profile and to the user's meta-taxonomy.

Network-Based and Other Related Technology

Some introduction to network-based and other technology may be helpful in understanding certain aspects of the invention.

One component of the present invention is a computer server. Servers are computer programs that provide some service to other computers, called clients. A client and server communicate by means of message passing often over a network, and use some protocol, a set of formal rules describing how to transmit data, to encode the client's requests and/or responses and the server's responses and/or requests. The server may run continually waiting for client's requests and/or responses to arrive or it may be invoked by some higher level continually running server which controls a number of specific servers. Client-server communication is analogous to a customer (client) sending an order (request) on an order form to a supplier (server) dispatching the goods and an invoice (response). The order form and invoice are part of the protocol used to communicate in this case.

Certain components of the present invention may reside on conventional processing systems, such as conventional personal computers (PCs) and/or server-class computer systems. FIG. 1 illustrates an example of such a processing system at a high level. The processing system of FIG. 1 includes one or more processors 100, read-only memory (ROM) 110, random access memory (RAM) 120, and a mass storage device 130 coupled to each other on a bus system 140. The bus system 140 includes one or more buses, which may be connected to each other through various bridges, controllers and/or adapters, which are well known in the art. For example, the bus system 140 may include a 'system bus', which may be connected through an adapter to one or more expansion, such as a peripheral component interconnect (PCI) bus or an extended industry standard architecture (EISA) bus. Also coupled to the bus system 140 are a mass storage device 230, one or more input/output (I/O) devices 150 and one or more data communication devices 160 to communicate with remote processing systems via one or more communication links 165 and 170, respectively. The I/O devices 150 may include, for example, any one or more of a display device, a keyboard, a pointing device (e.g., mouse, touchpad, trackball), an audio speaker.

The processor(s) 100 may include one or more conventional general-purpose or special-purpose programmable microprocessors, digital signal processors (DSPs), application specific integrated circuits (ASICs), or programmable logic devices (PLD), or a combination of such devices. The mass storage device 130 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 160 each may be any devices suitable for enabling the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, or the like. At least one of communication links may be a wireless link, to provide communication between mobile devices and a wireless network.

One embodiment of the invention utilizes fuzzy logic techniques. Fuzzy logic is a type of logic that recognizes more than simple true and false values. With fuzzy logic, propositions can be represented with degrees of truthfulness and falsehood. For example, the statement, today is sunny, might be 100% true if there are no clouds, 80% true if there are a few clouds, 50% true if it's hazy and 0% true if it rains all day.

Exemplary Architecture

Figure 2:
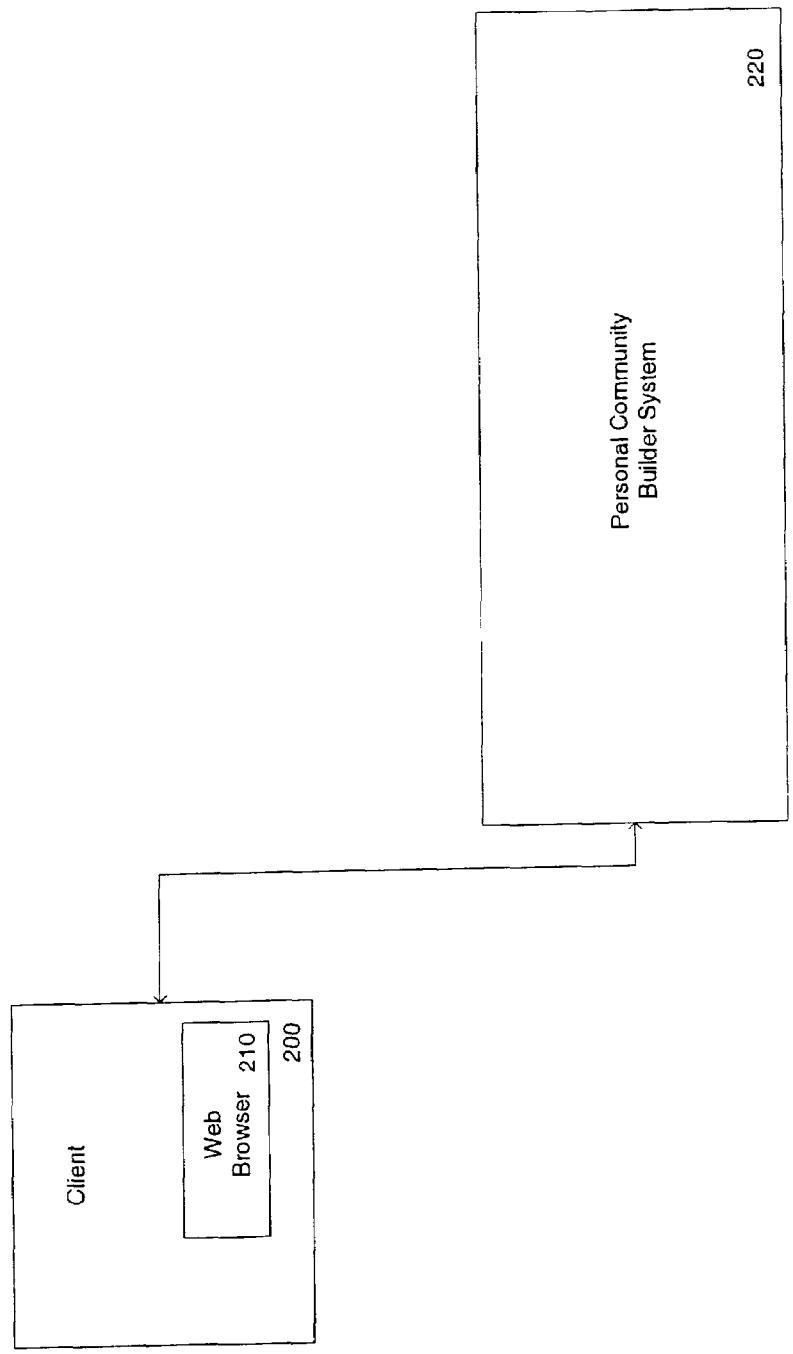
FIG. 2 illustrates an exemplary system architecture according to one embodiment of the invention.

FIG. 2 illustrates an exemplary network environment in which the described method and apparatus can be implemented. A client 200 includes a web browser 210 that is utilized by the user of the client to connect to event data located on a server hosting a Choice-based Relationship System (CRS) 220 providing users with ability to locate other users within the same event who share similar interests and skills. In one embodiment the CRS may be an application service provider (ASP) or a server application that can be integrated into a provider web-based systems. The client may also contain an application, database and an agent to communicate with a central host of CRS that acts as the matching, communication and reputation engine.

Figure 3:
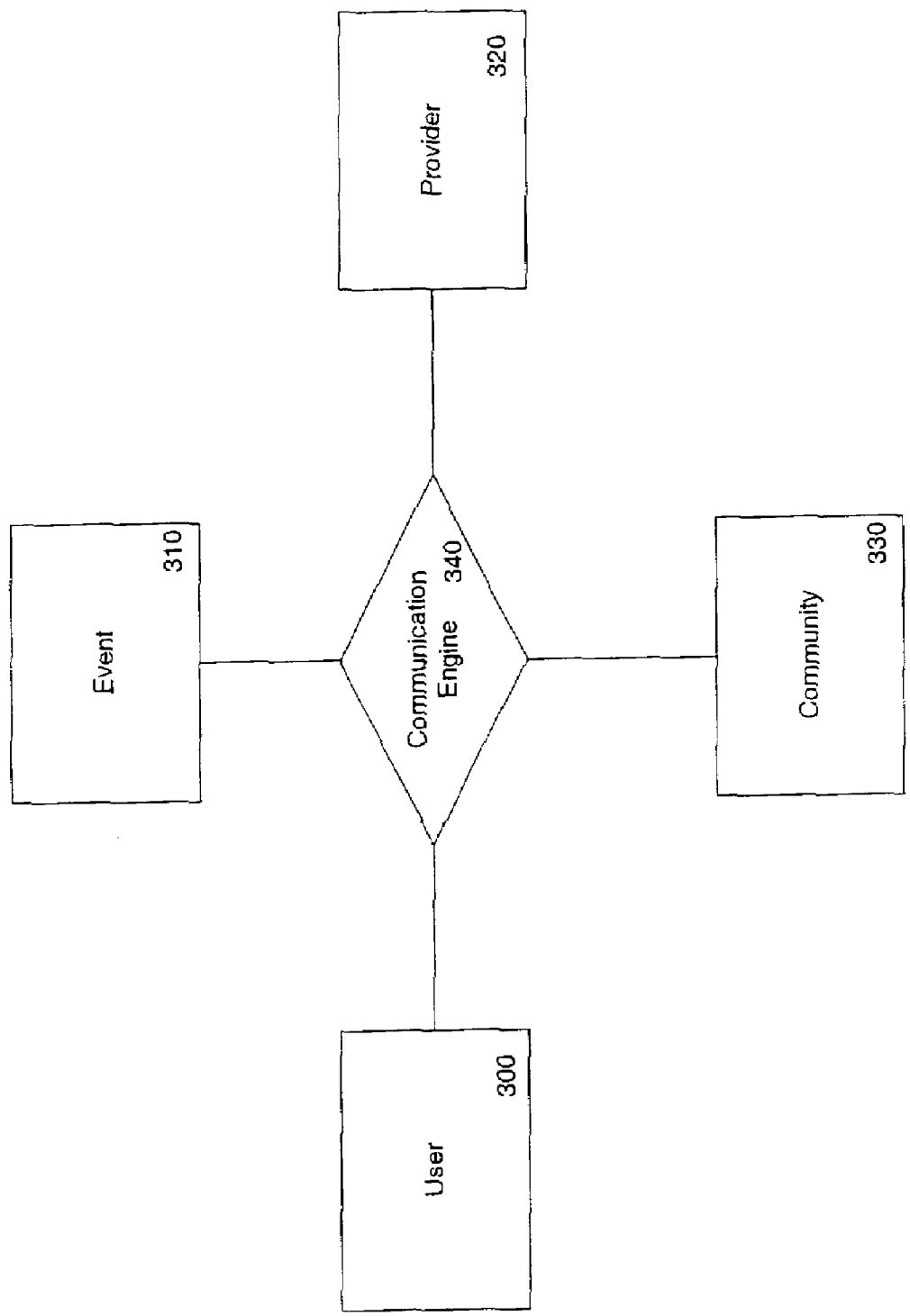
FIG. 3 illustrates components of a Personal Community Builder System according to one embodiment of the invention.
Figure 3A:
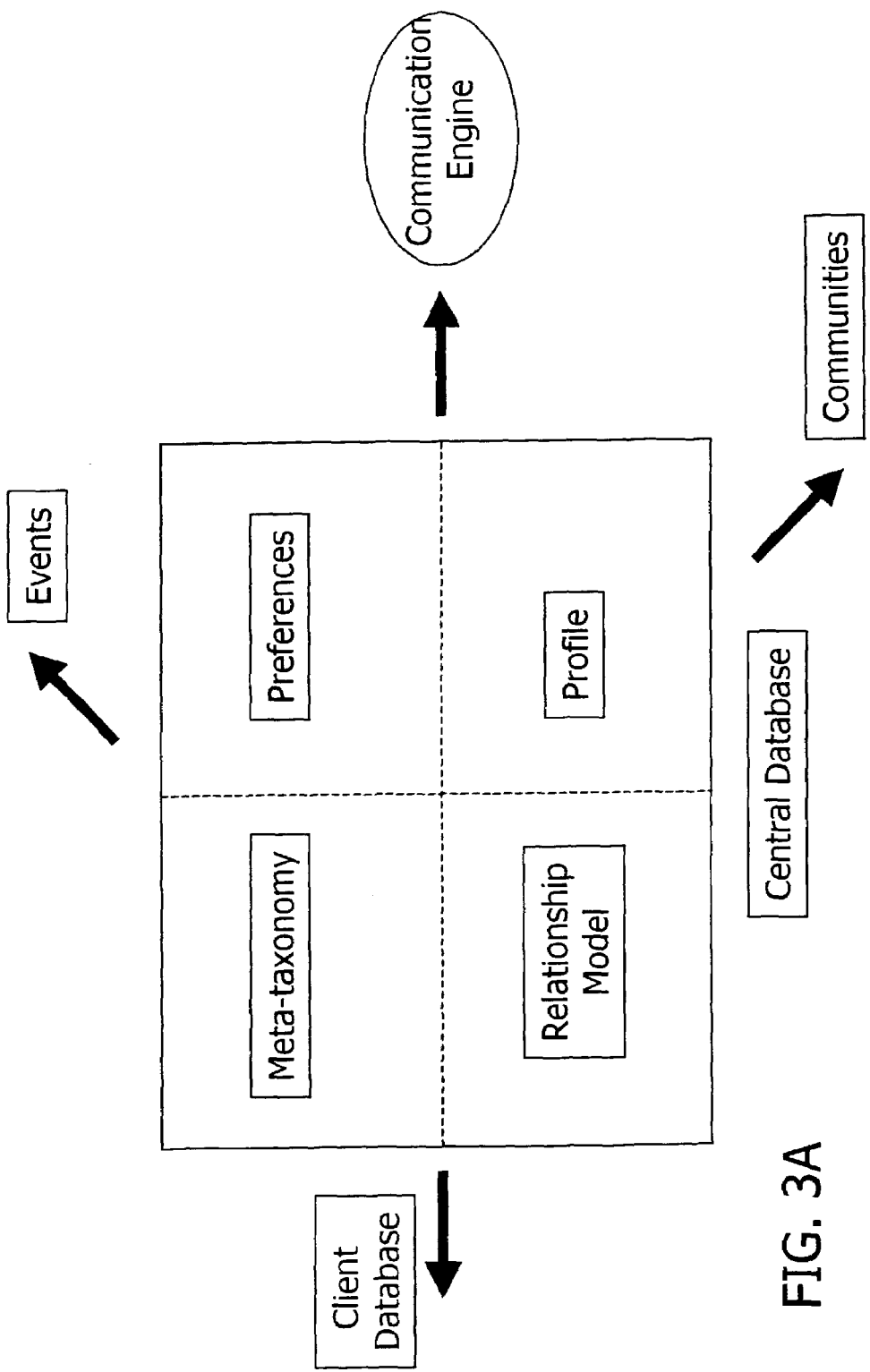
FIG. 3a illustrates components of a User Module according to one embodiment of the invention.

FIG. 3 illustrates high-level components of the Choice-based System 220. In one embodiment the CRS 220 includes a User module 300 that performs all necessary operations to create and maintain a user profile, which includes user data such as age, marital status, etc., and generic preferences, such as recreational preferences, sexual preferences, interests, etc. The User module 300 includes a database of user preferences based on user responses to event or community offered choices. The User module may also include a meta-taxonomy structure representing interests, choices and relevance of preferences to the user. The User module also includes a database of relationship rules and reputation information about users participating in the CRS community and event activities. In addition, the User module 300 is also configured to process a user's query as described in further detail below. Components of the User module are illustrated in FIG. 3a.

Figure 3B:
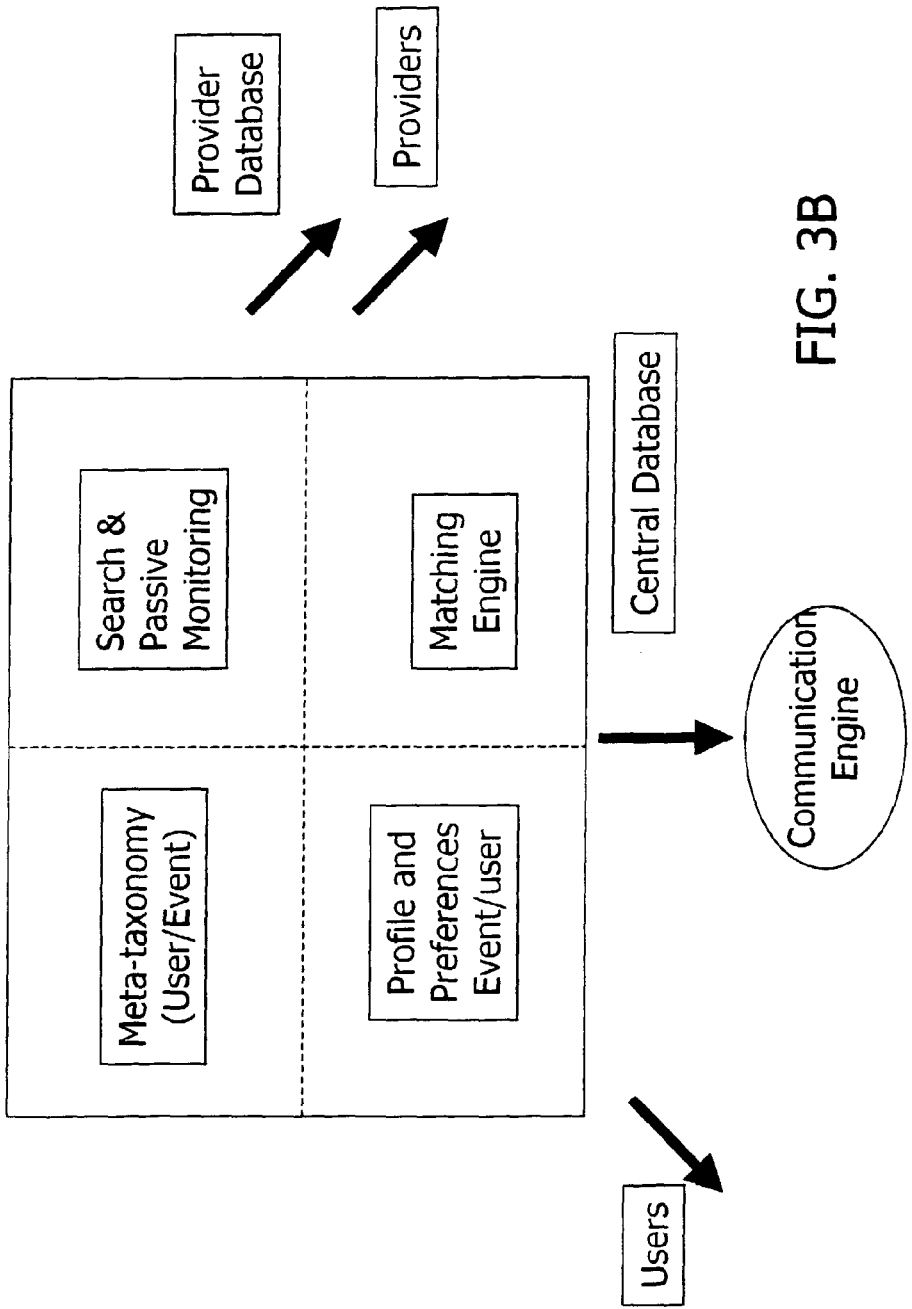
FIG. 3b illustrates components of an Event Module according to one embodiment of the invention.

The CRS 220 also includes an Event module 310 including specific information about the particular event as supplied by the provider and dynamically modified depending on user operations. The Event module 310 includes a meta-taxonomy established by the provider describing the event as a term metadata structure. The meta-taxonomy can be combined based on a set of rules with the meta-taxonomies of one or more users participating in the event, allowing effective management of relevant data for providing matches, as described below. The Event module 310 also includes Search and Passive Monitoring engine, which performs standard keyword searching employing, for example, known fuzzy logic techniques. It will be appreciated that other techniques, such as systemic networks techniques and the like, may be used and the present invention is not limited to the fuzzy logic techniques. In addition, the Search and Passive Monitoring engine performs passive searches on user provided preferences, such as searching for matches for all golfers over 50 years old. The Event module 310 also includes a Preferences database that includes imported user profiles and additional profile information provided by the user in a form of a response to preference options provided by the providers of the event. In addition, the Event module 310 comprises a Matching engine for providing the user with user-event matches, thus allowing users to find events relevant to their preferences and allowing providers of the events to identify users that may be interested in the events. Components of the Event module are illustrated in FIG. 3b.

Figure 3C:
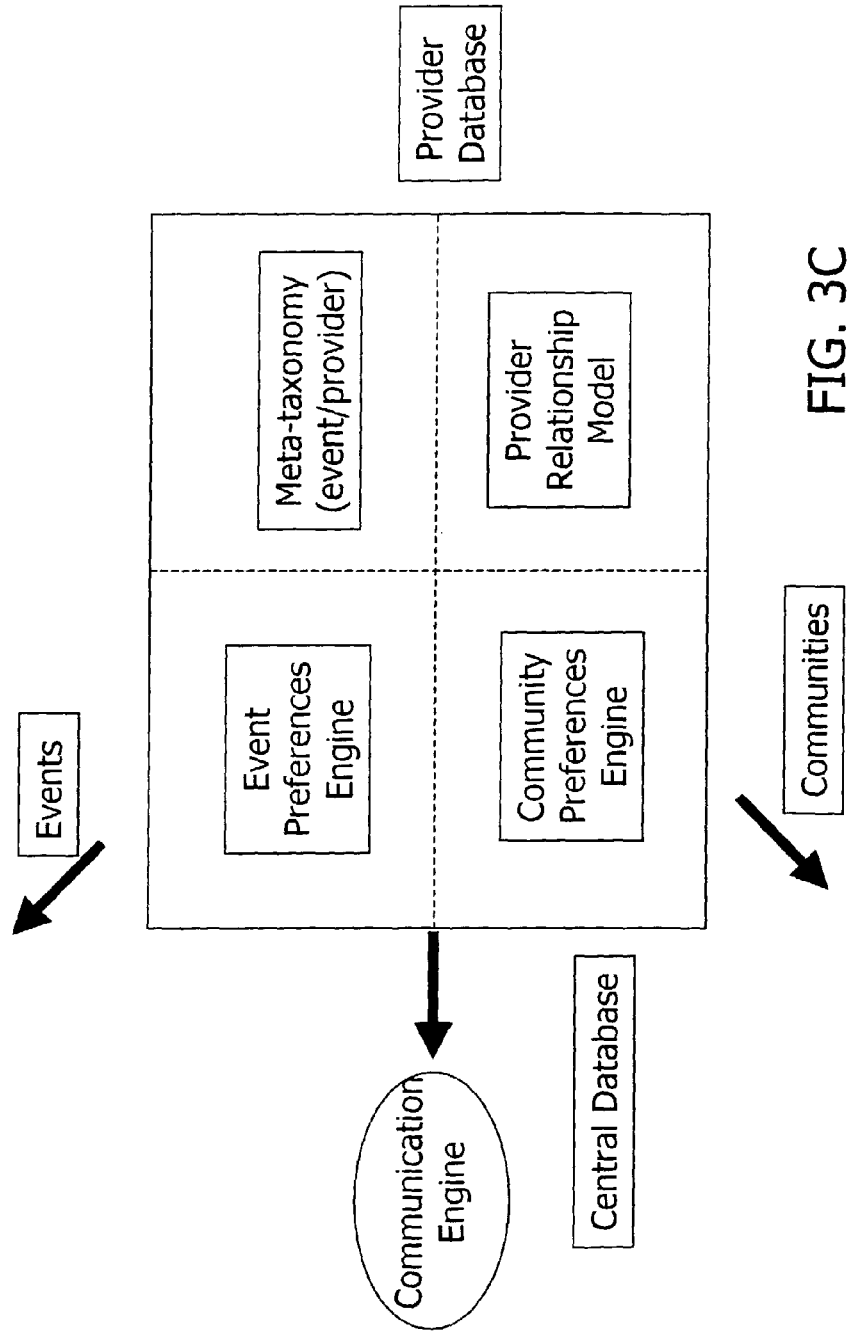
FIG. 3c illustrates components of a Provider Module according to one embodiment of the invention.

The CRS 220 also includes a Provider module 320 capable of processing information relating to a particular provider of the event. The Provider module 320 includes an Event Preference engine that consists of tools to automate the selections of preferences to offer users at the event. The module also includes a meta-taxonomy of the provider that relates by rules, including but not limited to fuzzy logic, to the event meta-taxonomy providing a dynamic tool for the provider to modify event contents based on user interests and provider responses. For example, upon recognition that a number of users enjoy playing ping pong as indicated by the meta-taxonomies of users participating in the event, the provider can add ping pong activity to the event and distribute this information to users interested in playing ping pong. A Provider Relationship Model database is another component of the Provider module 310. The database is maintained by the provider and includes relationships and reputations of users of communities and/or events to the provider that may be build utilizing, for example, systemic network techniques, or other similar techniques. The Provider module may also maintain a Community Preferences engine configured to present preference options to communities of users and maintain a relationship of meta-taxonomies of the provider and the community. Components of the Provider module 320 are illustrated in FIG. 3c.

Figure 3D:
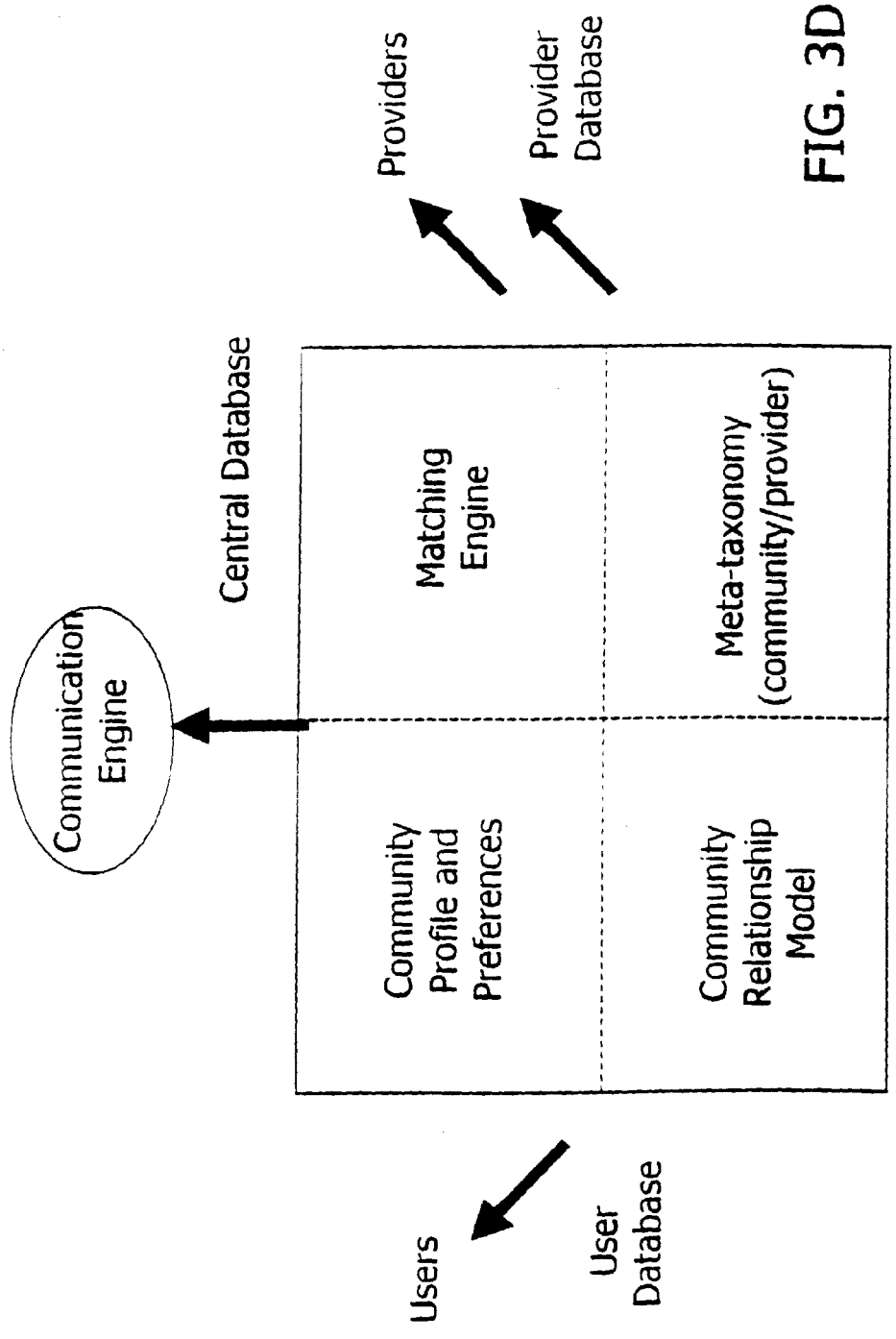
FIG. 3d illustrates components of a Community Module according to one embodiment of the invention.

In addition, the CRS includes a Community module 330 processing information about a community to which the user belongs. The Community module 330 is the aggregation of metadata, rules and reputation information about the users that make up the community. The module includes a Preferences database comprising community profiles and preferences of all users for the event or other community. The module also includes a Relationship model representing an aggregation of relationship information of the users. A meta-taxonomy is another component of the Community module and it includes meta-taxonomy of the community and a relationship of meta-taxonomies of the users and the provider with the meta-taxonomy of the community. The Community module 330 also includes a Matching engine, which provider matching opportunities similar to the event matching engine described above, i.e. matching users to particular community options. Components of the Community module are illustrated in FIG. 3d.

In one embodiment the CRS includes a security module (not shown) that provides a secure environment for users in order for them to trust the usage of their personal data, recorded choices, and communications, etc. Some or all of this data may reside with the provider, community, event, and the user. The architecture may be designed to accept any combination or singular retention and use of data. For example, the user may opt to allow the provider to access only limited personal data such as sex, age, etc., and aggregated data such as profession, sports, interests. In order to process matches the protected user data can temporarily or permanently be encrypted using methods well known in the art. The encryption may be unique to the event or activities of the event. For example, uniquely encrypted data regarding sexual preferences can be used for matching opportunities pertaining to sexual interests. The architecture also provides for either central or distributed methods of combining data between users, users and events, users and providers, and users and communities. The architecture supports the anonymity of any user, event, provider, community, or any combination of these entities. For example, users may be provided with pseudo names and passwords, which can be permanent or temporary for each event, these pseudo names prevent others from communicating or relating data to the actual users. Security index may be one of the meta-fields associated with meta-taxonomies and reputation indexes, thus providing both passive and active rules of matching associated with meta-taxonomy terms.

Functions and features of all the CSR components are described in detail below.

Methodology

Figure 6:
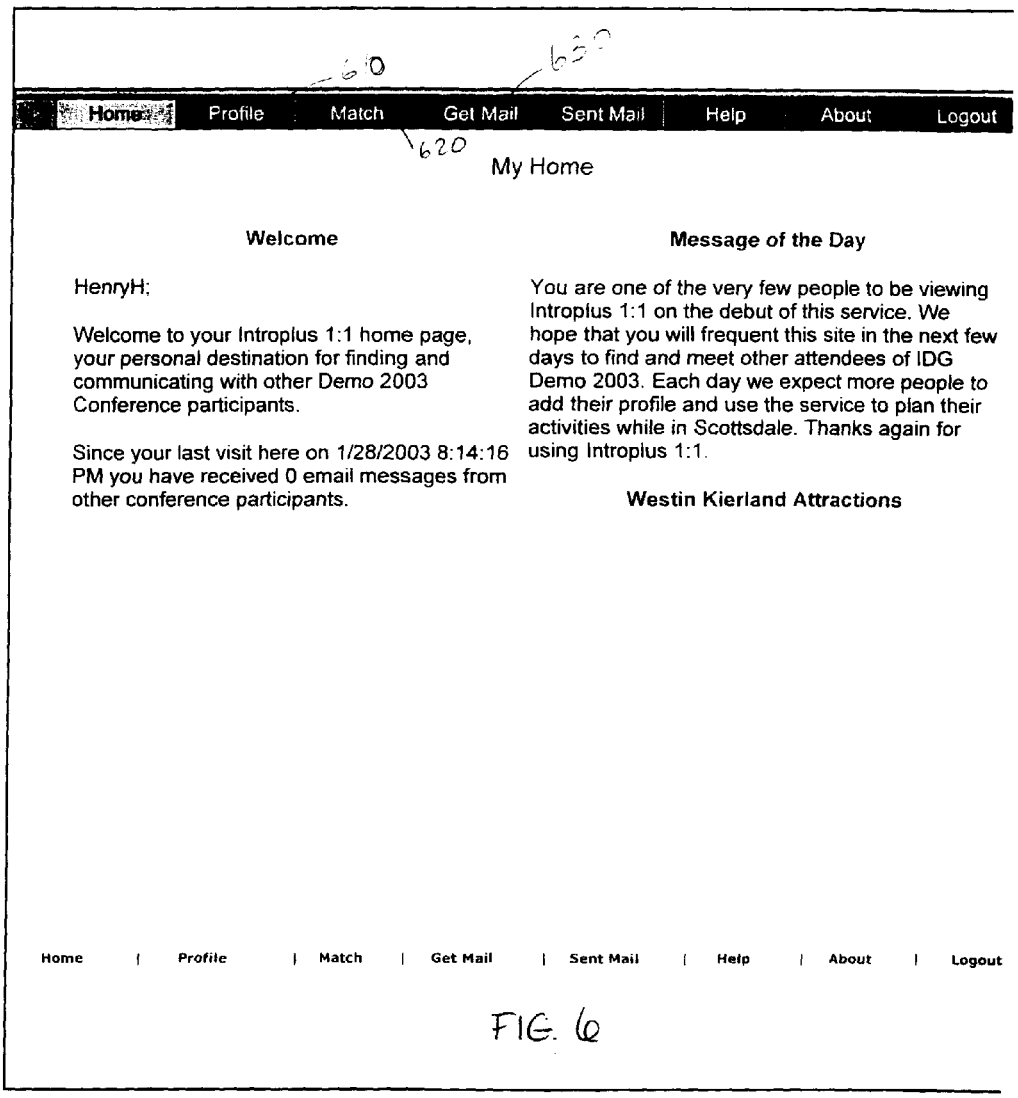
FIG. 6 illustrates a general graphical user interface presented to a user upon registering for an event according to one embodiment of the invention.

With these concepts in mind embodiments of the present invention may be further described. Upon registering for an event, such as a conference, the user may access a website provided by the provider of the event. The website can be associated with the CRS by incorporating features of the system into the substantive information about the event. The user may select the features of the CRS, for example, by clicking on a link presented on the web browser that will activate the functions of the CRS. FIG. 6 illustrates an exemplary interface that may be presented to the user upon selection of the CRS link. A profile of every user may be created upon the user selecting a profile tab 610.

Profile Creation

Embodiments of the invention are further described with reference to FIG. 4. At 400 a user's profile is created. A profile is a collection of terms and/or phrases that describe user's preferences, skills, characteristics, etc. The user's profile may be created by prompting the user to characterize himself/ herself by answering a list of questions or selecting an answer from a plurality of answers provided for a particular question. An exemplary interface that may be presented to the user at the web browser on the client's computer is illustrated in FIG. 5. FIG. 5 illustrates a list of questions, the answers to which will characterize user's professional skills and interests. As illustrated in FIG. 5, the user identifies himself by selecting an answer to a question "Who I am?" and also identifies his/her preferences by selecting skills and interests of other people that the user would like to meet. The terms of the profile may be updated dynamically upon monitoring user's activity during a particular event. The terms of the profile may also be updated manually by the user him/herself specifying which terms to remove and which to add. Thus, the terms of the profile may change during a particular event to more accurately capture user's preferences, skills, characteristics, etc.

In one embodiment every profile is associated with a meta-taxonomy including the terms describing the user that are associated with metadata, i.e. meta field, identifying how accurate the term describes the user, i.e., relevance of the term to the user's profile. The metadata may be used to more accurately match the user with other users that satisfy the user's inquiry requirements. The metadata is a function of frequency, time, dependencies, situation, etc. CRS utilizes rules to determine appropriate metadata to be assigned to each term in the user's meta-taxonomy. For example, the CRS may assign metadata to a particular term based on frequency of the user's usage of the term in requesting a potential match, thus if the term is used more frequently then metadata reflects that this particular term is of a great relevance to the user. In addition, the CRS may utilize time rule when assigning metadata to a term by analyzing whether a particular term depends on time of the day, weather season, etc., for example skiing when it is summer season in Texas is not of a great relevance to the user's profile, thus the assigned metadata will reflect low relevancy. It will be appreciated that variety of other rules may be generated to assign metadata to profile terms based on frequency, time, situation, etc., and the present invention is not limited to the ones described above. For example, metadata may be assigned based on how specific the term is within a meta-taxonomy hierarchy, i.e. "golf" within "sport" hierarchy is assigned a greater relevancy that the "sport" term and "Pebble Beach" term within the sport hierarchy is assigned a greater relevancy than the terms "golf" and "sport".

The profiles of the user may be stored in the user's profile storage database (not shown) that includes all profiles of all the users that used the features of the CRS for at least one event. Thus, when the user registers for the new event and decides to utilizes the features of the CRS, the user's profile from previous events may be retrieved from the user's profile storage database and presented to the user for an update. The user may then update the profile depending on the changes in the user's personal and professional interests and skills. In one embodiment, the retrieved profile of the user may be automatically altered depending on the actual event, time of the year, etc. For example, if the user's profile includes that the user likes to play golf and the current event that the user is registered for takes place in Boston in December, the CRS may inactivate "golf" term from the user's profile since the user will not be playing golf while attending the event. Another example that illustrates this feature of the present invention is if the user's profile identifies that the user likes to play golf early in the mornings and the current event has lectures and workshops scheduled every morning, then the CRS may inactivate that characteristic from the user's profile since the user will not be able to play golf in the mornings because he/she will be attending lectures and/or workshops. Thus, the user's profile may be automatically altered to allow more accurate relationship building based on a set of rules that depend on time, day, general event description, etc.

In another embodiment, the CRS may generate a profile of a typical user attending a particular event by analyzing statistical information about characteristics/preferences of users attending different events. Thus, the CRS may contain a general profile of a typical user per event in general profiles database (not shown). Before or upon the user registering for a particular event, the CRS may provide an unfilled profile to the user or may retrieve the general profile of a typical user for that particular event and presents it to the user for corrections/updates.

Yet, in another embodiment, the user's profile may be updated automatically by CRS monitoring user's activity, such as choice selections, within a particular event or across several events. For example, if the user inquires about other people who play golf at majority of the events that the user attends, but the user's profile does not include the term golf, CRS invokes an automatic update module to insert the term "golf" into the user's profile and assign to the term metadata identifying the relevancy of the term.

In addition to user profiles, the CRS maintains event profiles, community profiles and provider profiles identifying characteristics and options of events, communities and providers. These profiles allow the CRS to recommend events, communities and providers to users based on similarity of users profiles and event, community and provider profiles.

In one embodiment a user may have more than one profile describing his/her preferences, for example one profile may concentrate on user's preferences as a married couple for family events, such as cruises, the other profile may concentrate on user's preferences as a single person for personal events, such as professional conferences.

Query Submission

Figure 4:
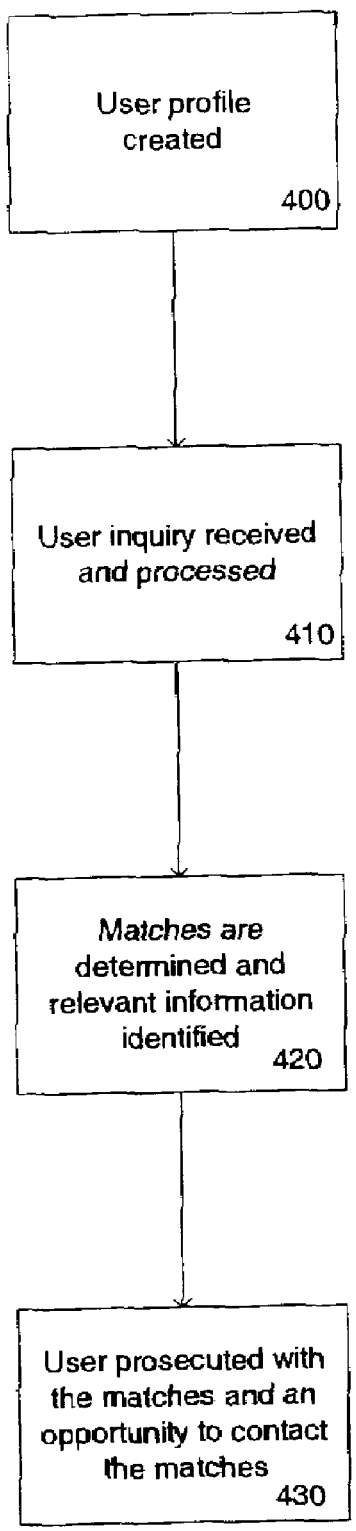
FIG. 4 is a flow diagram of a matching process according to one embodiment of the invention.

Once the user has a created profile, the user may submit an inquiry at 410 of FIG. 4 to identify users that the user may want to contact. FIG. 7 illustrates a graphical user interface that may be presented to the user upon the user selecting Match tab 620 of FIG. 6. The user may conduct a quick search for selecting general categories such as "People who offer what the user needs or need what the user offers", "People who share user's professional interests", "People who share user's personal interests", etc. In addition, the user may conduct an advanced search by selecting his/her profile terms that the user believes are important in identifying a potential match.

In addition, the user may also enter a phrase, such as "Who does like to play golf in the morning?", upon submission of which the CRS identifies key words in the query, such as "golf", and invokes its search engine to perform the search of users whose profiles have terms related to golf. It will be appreciated that a variety of other techniques may be utilized to allow the user to submit a query and the present invention is not limited to the techniques and methods described above.

Matching

Upon the user submitting the inquiry, the CRS invokes the search engine at 420 of FIG. 4 to identify other users within the community or community of the event that have characteristics matching the inquiry. In one embodiment, the user is presented with the list of people whose interests match the user's interests to some degree. The user may also be presented with a categorized list wherein the categories represent different topics within the event meta-taxonomy that can be displayed based on the degree of object relevance (degree of the match). Within each category there are keywords that further describe the category and are listed based on rules including degrees on interest, number of others with similar interest, etc. For example, the user may be presented with the following list:

Category 1—500 people

Category 2—30 people

Category 4—27 people

Category 5—4 people, wherein all categories represent some interest, with Category 1 being the smaller degree of interest and Category 5 being the greater degree of interest. For example, Category 1 may represent an interest in dinning and Category 5 may represent an interest in eating Chinese food within one mile of the event. Upon presenting the user with the categorized list the user may select a category in order to see individual matches within the selected category.

In one embodiment the user may request a search of users who have a particular characteristic. As described above, the user may submit a question, such as "Who does like to play golf?" Upon submission of the query, the CRS retrieves the keyword "golf" and identifies profiles of other users who have the same or related term. Some terms may be related in fact. For example, the term "sport" and "fitness" are related in fact and if the user's inquiry, or profile, include the term "sport", then profiles that include the term "sport" and/or the term "fitness" can be identifies as potential matches. Some terms may be related by association, because the user treats the terms as related. For example, the user may treat the term "playing golf" and "reading about golf" as related. Thus, then the profiles that include at least one of these terms can be identified as a potential match to the user's inquiry that includes one of these terms or to the user's profile that includes one or both of the terms. The terms related by the association may be identified by the CRS as related by monitoring user's activity across a variety of events that the user is interested in, such as types of events in which the user participates, word choices in user inquiries, types of communication made wither other users, etc. It will be appreciated that variety of other user activities may be monitored to determine which terms are related by association according to the user.

In one embodiment the user selects to perform an advanced search wherein the user manually may select term categories which are present in other users' profiles. Upon the user selecting several term categories, the search engine of the CRS identifies users whose profiles include an intersection of the user selected term categories, i.e., profiles that have at least one term related to each user selected category. Once matching users are identified, the user is presented with a list of the matches in addition to the relevant event information retrieved from the event information database. For example, if one of the categories selected by the user is golf, then the user is presented with a golf schedule at a nearby golf course provided by the event providers. In one embodiment to allow the user to quickly select the best match, the matching list is compiled starting with the strongest match and ending with the weakest match.

In one embodiment of the present invention, next to every name in the match list, there is a list of main terms within that person's profile which caused the search engine to identify his/her as a good match. FIG. 8 is an exemplary graphical user interface that may be presented to the user. The order of the names in the list and the list of main terms allows the user to make an informative decision while selecting people for contact.

In one embodiment CRS includes a normalized profile associated with normalized meta-taxonomy representing a general profile of a typical user for a particular event. Thus, if each user is an object then normalized groups of users represent an aggregate object which can represent a "normalized user". The normalized profile along with the associated meta-taxonomy may be generated based on statistical information collected by the CRS for the same event over a period of time, and/or it may be generated from a community of users at the event or previous similar events, made available by a provider of the event. The normalized profile may also be provided by the providers of the event. Once an inquiry from the user is received, the profile and meta-taxonomy of the query user is compared to the normalized profile and meta-taxonomy. The difference between the query user profile and the normalized profile allows the CSR to determine relevancy of particular preferences and categories to the query user and update meta-fields of terms located in meta-taxonomy of the query user. Rules can then be established to determine the types and degree of matches among users based on term relevancies. Patterns of terms and their respective metadata can be used to establish groupings and matches of user preferences. For example, night owls may establish choices around a variety of late night events and activities. The degree of such interest relative to one or more normalized groups of users provides matching opportunities beyond the expressed specific preferences. Similarly, deviations from normalized objects can be used as preference filters or may be utilized to assign reputation indexes to users. Reputation indexes are described in detail below.

It will be appreciated that user profiles and meta-taxonomies may be compared to the normalized profile and the associated meta-taxonomy at any time and does not have to be performed during a submission of a user inquiry. For example, the comparison may be performed upon the user registering with a particular event.

Communication

Figure 10:
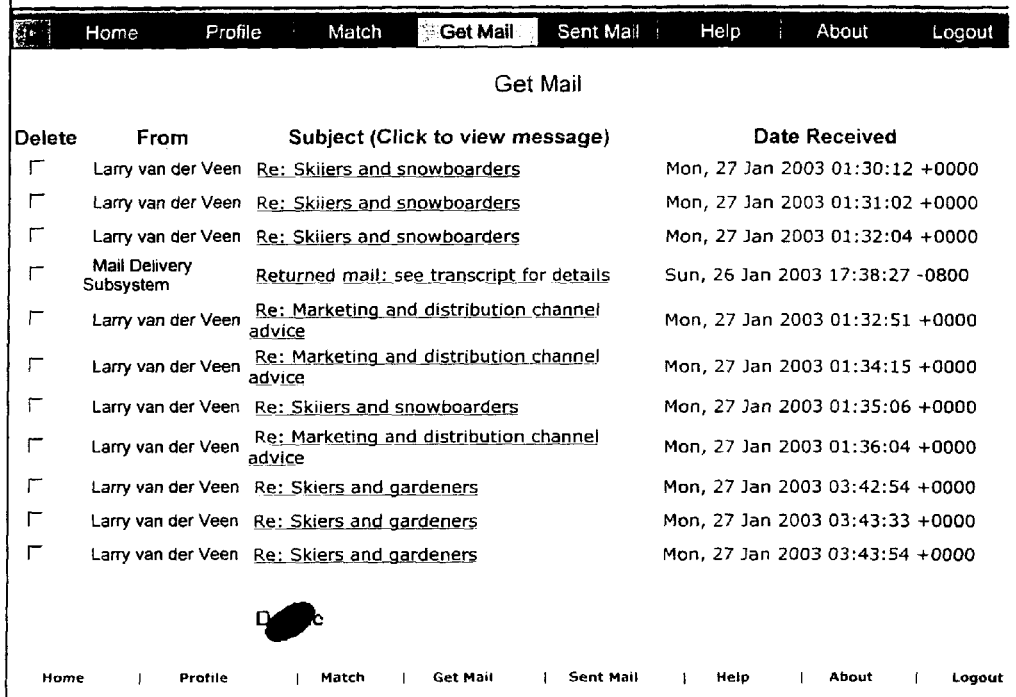
FIG. 10 illustrates an inbox of the user according to one embodiment of the invention.

Once the user is presented with the matching list, the user is able to select particular users from the list in order to contact them. In one embodiment the contact is made via an electronic mail communication. However, it will be appreciated that other means of communication can be utilized, for example, live chatting if both users are connected to a network, online forums, and the like. In one embodiment the user is presented with a list of subject lines that the user may select for entitling his/her email communication to be sent to the matches. For example, as illustrated in FIG. 10, the presented choices may be "Lets make plans now", "Meet at destination", "Apologies and regrets". Each subject line may be accompanied by a standard message that the user may choose to be sent to the matches rather than typing his/her own letter. However, the user may type his/her own letter by selecting such an option as illustrated in FIG. 10. The user then may preview, edit and then send the email to the selected recipient or recipients.

In one embodiment each user upon registration to the event is provided with an inbox wherein all the incoming messages from other users can be received. Upon the user selecting the Get Mail tab 630 of FIG. 6, the user may be presented with a graphical user interface illustrated in FIG. 10, which allows the user to view emails sent to him/her from other users, i.e. participants of the event. In addition, the user may review emails that he/she sent out, delete emails, etc.

The CRS allows each user to prepare and store messages that can be re-used and modified for later use. The intersection of the user and event meta-taxonomy can be used to filter and present these messages or choice options. For example, if an event is taking place in December in Boston, then messages relating to playing golf options will not be presented to the user for re-use or modification. In one embodiment, user's communications can be utilized for updating event meta-taxonomy, community meta-taxonomy, filtering rules, reputation databases, etc.

In one embodiment the user may modify communication options associated with his/her profile. As stated above the options may be email, online chat, online forum session, etc. In another embodiment, the profile is not associated with a communication option and the user is presented with communication option along with the matching list. If the user selected an online chat, then the matching list presented to the user may identify which users in the matching list are currently connected to the network. In addition, the user may be notified if a user from the matching list previously presented to the user, but not contacted by the user, connected to the network while the query user browsers other options of CSR. In addition, the user may join an online forum including individuals from the matching list presented to the user. These and other similar communication methods are well known in the art and further details are not necessary for understanding of the present invention.

Reputation

In one embodiment profile of each user is assigned a reputation index reflecting the trustworthiness of each user. Thus, if a user is determined to be a spammer, his/her reputation index is low. In addition, the reputation index reflects trustworthiness of a user in relation to the other users in addition to the trustworthiness in relation to the entire community. For example, if two users have a history of contacting each other during an event or previous events, a relationship scale can be created as to the degree of "buddiness" based on rules. In addition, reputation index reflecting trustworthiness of one user in relation to another may be based on reputation index assigned to each of these users based on communication with other users. For example, if user A and user B are considered "buddies" and user A and user C are considered "buddies", then the reputation index of user C in relation to user B may be lower than "buddies" and determined based on reputation index of user A in relation to B and user C in relation to A. In one embodiment the reputation index may be as follows: 0—neutral, 1—good, -1—bad. In addition, fuzzy logic techniques may be utilized to assign reputation index to the users. It will be appreciated that several degrees of "buddies" may be utilized based on a frequency of communication between two users. In addition, other methods may be employed in assigning the reputation index to the users, for example, systemic networks techniques, and the present invention is not limited to the method described above.

As in meta-taxonomies, each user reputation index can be represented as an object consisting of metadata, rules and relationship structures represented by terms or other means. The degree of intersection of these objects and relation of these objection to normalized objects can be used to determine the reputation of one user to another even if two users have no direct association. These processes are dynamic and can be modified in relation to an event or community. For example, a mud wrestler may have one reputation at a motorcycle event and other at a church event. Events, providers and communities can also be represented by reputation objects.

In one embodiment the matching list presented to the user includes information about reputation of each user on the list to allow the user to make an informative decision of who to select for contact from the matching list. In addition, the matching list may be sorted based on users' reputation indexes.

Event Recommendations

In one embodiment of the present invention the CRS is able to compile an event recommendation list to be provided to a user who has been to at least one event in the past and whose profile is stored in the user's profile storage database. The CRS includes database of current events, information about which is provided by event providers. Each event includes a profile and an associated taxonomy with terms, in turn associated with metadata. Event profiles includes terms that describe the event in such a way as to allow CRS to identify users who may be interested in participating in the event. Upon receipt of a new event, the CRS invokes a prediction engine to compare the profile and meta-taxonomy of the new event to the profiles and meta-taxonomies of every profile stored in the user's profile storage database. Upon detection of a match, the user of that profile is notified about the new event that may be of interest to the user.

In another embodiment the provider of the new event may provide CRS with a general profile of a typical user that may be interested in attending the new event. Upon receipt of such general profile, the recommendation engine then compares the general profile to the profiles stored in the user's profile storage database. Upon detection of a match, the CRS notifies the user of the new event that may be of interest to that user.

In one embodiment the user may be presented with a recommendation of events, which communities may be of interest to the user. For example, if the community profile includes terms that are of high or moderate relevancy to the user, then the community may be identified as of interest to the user. In addition, the user may be presented with a recommendation of events, which providers may be of interest to the user. If provider's profile includes terms of high or moderate relevancy to the user, then the provider may be identified as of interest to the user and the user may be notified of the event that the provider is organizing.

CONCLUSION

A method and process of building relationship opportunities among event participants before, during and after the event are described. The relationship opportunities are identified by associating terms describing user's preferences, interests, skills, etc., with some type of logic and relevancy indexes to accurately predict user's interest in contacting other event participants, attending other events and learning about other communities and providers.

It will be recognized that many of the features and techniques described above may be implemented in software. For example, the described operations may be carried out in a processing system in response to its processor(s) executing sequences of instructions contained in memory of the device. The instructions may be executed from a memory such as RAM and may be loaded from a persistent store, such as a mass storage device, and/or from one or more other remote processing systems. Likewise, hardwired circuitry may be used in place of software, or in combination with software, to implement the features described herein. Thus, the present invention is not limited to any specific combination of hardware circuitry and software, nor to any particular source of software executed by the processing systems.

Thus, a method and apparatus for matching event participants with common interests before the event have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method comprising:
   electronically creating an event related profile of a first user registered for an event hosted by a third party provider where at least one user is unknown to a second user, the profile includes terms indicative of preferences with respect to the third party hosted event and characteristics of the first user;
   electronically monitoring activities of the first user prior to, during, and after participation of a third party hosted event;
   electronically automatically updating the profile of the first user according to third party hosted event activities of the first user;
   electronically receiving an inquiry from the first user for at least one match with a second user based on at least one keyword;
   electronically providing a list of matches of other users at the third party hosted event to the first user in response to the inquiry,
   wherein the match is a second user sharing at least one relevant interest with the first user based on profiles of the first and second users, wherein the first user and the second user register to participate in at least one common or related third party hosted event.

2. The method of claim 1 wherein the event is a social or gathering event hosted by a third party intended for the matching of relevant interests of a group of two or more people.

3. The method of claim 1 wherein the event is one of a business conference, a cruise, a social gathering or a virtual event hosted by a third party and conducted over a communication method where at least one user is unknown to the second user, and wherein at least one user does not have contact information of the second user.

4. The method of claim 1 wherein each term of the profile is associated with a taxonomy which includes metadata.

5. The method of claim 1 wherein the first and second users are matched based on a reputation index that measures relative trustworthiness of the first user and the second user based on a normalized user representing a model era normal user rather than an actual user of a group of users participating in the at least one common event or related event hosted by a third party.

6. The method of claim 1 wherein one user profile and any related information is encrypted uniquely for any event hosted by a third party for a purpose of exchange with a second user such that neither user obtains the other profile or any related information.

7. The method of claim 1 wherein the profile is associated with at least one event hosted by a third party with two or more user participants, wherein the profile includes metadata and/or taxonomy for identifying a relevancy of a term.

8. The method of claim 1 further comprising searching profiles of other users to identify matches to the first user inquiry by comparing at least one keyword of the inquiry to terms of profiles of other users.

9. The method of claim 1 further comprising searching profiles of other users to identify matches to the first user inquiry by comparing the profile of the first user to a normalized user profile and comparing profiles of other users to the user normalized profile.

10. The method of claim 9 wherein the normalized user profile represents a typical user of the event, rather than an actual user.

11. The method of claim 1, wherein the first and at least one second user are unknown to each other and are matched based on reputation of the first and second users of entities that the first and second users are representing during the third party hosted event and wherein the reputation of the first and second users is specified via profiles of the first and second users.

12. The method of claim 11, wherein the reputation of the first and second users includes an executive title of the first and second users with respect to their entities being represented.

13. The method of claim 12, wherein the first and second users are matched further based on business objectives of the first and second users with respect to the event.

14. The method of claim 13, wherein the business objectives comprise at least one of finding technology partners, finding investments, finding customers, and introducing the entity representing to inventors.

15. The method of claim 14, wherein the first and second users are matched further based on a business topic that the first and second users will discuss when the first and second users meet during the third party hosted event.

16. The method of claim 15, wherein the at least one keyword indicates an activity unrelated to the third party hosted event that the first user would like to participate during the third party hosted event but outside of a schedule of the event, and wherein at least one second user unknown to the first user also indicates an interest in the activity via a profile of the second user.

17. The method of claim 16, further comprising presenting a list of facilities within a predetermined geographic proximity of the third party hosted event that provide the activity.

18. The method of claim 1 further comprising providing a secure data model exchange among user, third party hosted event, event provider, or user community profiles such that rules define what information is exchanged and such exchanges can be temporarily encrypted to prevent loss of data.

19. The method of claim 18 further comprising integrating event based profile, meta-taxonomy, or other event based information from the user, community, event provider, or third party hosted event, wherein the information is temporarily unencrypted for matching engine to establish relevant matches.

20. An apparatus comprising:
means for creating a profile of a first user registered for an event hosted by a third party where at least one user is unknown to a second user, the profile includes terms indicative of preferences with respect to the event and characteristics of the first user;
means for monitoring activities of the first user prior to, during, and after participation of the third party hosted event;
means for automatically updating the profile of the first user according to the third party hosted event activities of the first user;
means for receiving related to a third party hosted event an inquiry from the first user for at least one match with a second user based on at least one keyword;
means for providing a list of matches of other users at the third party hosted event to the first user in response to the inquiry,
wherein the match is a second user sharing similar interests with the first user based on profiles of the first and second users, wherein the first user and the second user register to participate in at least one common or related event hosted by a third party.

21. A machine-readable medium having instructions therein, which when executed by a processor, cause the processor to perform a method, the method comprising:
electronically creating a profile of a first user registered for an event hosted by a provider where at least one user is unknown to a second user, the profile includes terms indicative of preferences with respect to a third party hosted event and characteristics of the first user;
electronically monitoring activities of the first user prior to, during, and after participation of the third party hosted event;
electronically automatically updating the profile of the first user according to the third party hosted event activities of the first user;
electronically receiving related to a third party hosted event an inquiry from the first user for at least one match with a second user based on at least one keyword;
electronically providing a list of matches of other users at the third party hosted event to the first user in response to the inquiry,
wherein the match is a second user sharing relevant interests with the first user based on profiles of the first and second users, wherein the first user and the second user register to participate in at least one common or related third party hosted event.

* * * * *